O. ANDREWS.
METHOD OF PACKING FISH.

No. 181,549. Patented Aug. 29, 1876.

WITNESSES
Oscar Andrews INVENTOR
By his Attys.

UNITED STATES PATENT OFFICE.

OSCAR ANDREWS, OF GLOUCESTER, MASSACHUSETTS, ASSIGNOR OF THREE-FOURTHS OF HIS RIGHT TO GEORGE FRIEND, GEORGE F. FRIEND, AND FRED. C. LANGSFORD, OF SAME PLACE.

IMPROVEMENT IN METHODS OF PACKING FISH.

Specification forming part of Letters Patent No. 181,549, dated August 29, 1876; application filed July 8, 1876.

*To all whom it may concern:*

Be it known that I, OSCAR ANDREWS, of Gloucester, in the county of Essex and State of Massachusetts, have invented a new and Improved Method of Packing Dried Fish in boxes for sale; and I do hereby declare that the following is a full, clear, and exact description thereof, reference being had to the accompanying drawings.

It has been customary in packing dried fish in small boxes for sale, to lay it in in strips torn or otherwise taken from the fish "with the grain," the said strips being laid lengthwise in the boxes, or else thrown in in hardly any order. By this method it has been impossible to prevent the air from coming in contact with the strips of fish, so that it is extremely liable to dry up, and to turn red in the heat of summer. I obviate this difficulty by first cutting the fish transversely across the grain, thus leaving a smooth edge, and then packing it in the boxes with the grain of the fish running perpendicularly, and the smooth flat edges or ends facing the bottoms and tops of the boxes.

Figure 1:
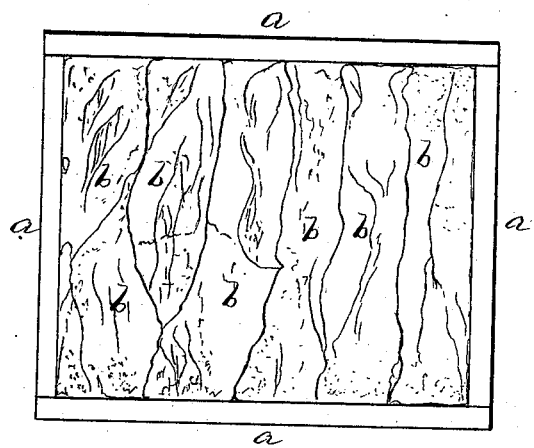
Figure 2:

In the accompanying drawings, Figure 1 is a plan view of a box of fish packed in my above-described method, with the cover removed. Fig. 2 is a transverse vertical section of the same, with the cover in place.

$a$ represents the box, and $b$ $b$ represent the pieces of fish packed closely in the box, the grain running perpendicularly.

By my means of packing, great compactness is secured, so that the air is entirely excluded and cannot get between the pieces of fish. Consequently the fish is not liable to dry up, or to turn red in the heat of summer, as is the case by the old method of packing loosely in strips. An additional advantage is that a square, solid package is produced.

Having thus fully described my invention, what I claim, and desire to secure by Letters Patent, is—

The above-described method of packing dried fish, consisting in placing upright pieces of fish closely together in the box, the grain of the said pieces running perpendicularly to the bottom of the box, and said pieces having been originally cut transversely from the fish, all substantially as and for the purposes hereinbefore set forth.

OSCAR ANDREWS.

Witnesses:
HENRY W. WILLIAMS,
B. W. WILLIAMS.